(12) United States Patent
Sobran et al.

(10) Patent No.: US 11,455,566 B2
(45) Date of Patent: Sep. 27, 2022

(54) CLASSIFYING CODE AS INTRODUCING A BUG OR NOT INTRODUCING A BUG TO TRAIN A BUG DETECTION ALGORITHM

(71) Applicant: International Business Machines Corporation, Armonk, NY (US)

(72) Inventors: Alexander Sobran, Chapel Hill, NC (US); Bo Zhang, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1198 days.

(21) Appl. No.: 15/924,120

(22) Filed: Mar. 16, 2018

(65) Prior Publication Data

US 2019/0287029 A1 Sep. 19, 2019

(51) Int. Cl.
*G06N 20/00* (2019.01)
*G06F 11/36* (2006.01)
*G06N 5/04* (2006.01)

(52) U.S. Cl.
CPC ........... *G06N 20/00* (2019.01); *G06F 11/362* (2013.01); *G06N 5/04* (2013.01)

(58) Field of Classification Search
CPC ............... G06F 11/362; G06F 11/3664; G06N 20/00; G06N 5/04
See application file for complete search history.

(56) References Cited

U.S. PATENT DOCUMENTS

| | | | |
|---|---|---|---|
| 7,437,722 B2 | 10/2008 | Poole | |
| 8,495,564 B2 * | 7/2013 | Martineau | ................ G06F 8/33 717/106 |
| 9,141,378 B2 | 9/2015 | Fox et al. | |
| 9,542,176 B2 | 1/2017 | Bird et al. | |
| 9,588,876 B2 | 3/2017 | Swierc et al. | |
| 9,824,002 B2 | 11/2017 | Shann et al. | |
| 10,949,338 B1 * | 3/2021 | Sirianni | ............. G06F 11/3688 |

(Continued)

FOREIGN PATENT DOCUMENTS

WO    WO-2015065367 A1 *    5/2015    ............ G06F 11/008

OTHER PUBLICATIONS

N. Mostafa et al., "Tracking performance across software revisions," dated 2009, PPPJ '09 Proceedings of the 7th International Conference on Principles and Practice of Programming in Java, Computer Science Department University of California, Santa Barbara, Total 10 pages.

(Continued)

*Primary Examiner* — Wei Y Zhen
*Assistant Examiner* — Brahim Bourzik
(74) *Attorney, Agent, or Firm* — Konrad Raynes Davda & Victor LLP; David W. Victor (57) ABSTRACT

Provided are a computer program product, system, and method for classifying code as introducing a bug or not introducing a bug to train a bug detection algorithm. For each commit in a commit history of code changes to the code base, a determination is made of lines of code changed by the commit. For each line of code changed by the commit, a determination is made as to whether the commit is for a (Continued)

bug fix. A determination is made as to whether a previous commit changing the line of code changed by the commit for the bug fix in response to determining that the commit is for the bug fix. Indication is made that the previous commit introduced a bug. The algorithm is trained to classify changes to lines of code by commits indicated as having introduced a bug as bug introducing commits.

23 Claims, 7 Drawing Sheets

(56) References Cited

U.S. PATENT DOCUMENTS

| | | | | |
|---|---|---|---|---|
| 2009/0210860 | A1* | 8/2009 | Sutherland | G06F 8/74 717/123 |
| 2015/0363294 | A1* | 12/2015 | Carback, III | G06F 8/37 717/132 |
| 2017/0212829 | A1* | 7/2017 | Bales | G06F 11/3664 |
| 2018/0150742 | A1* | 5/2018 | Woulfe | G06F 11/362 |
| 2018/0267886 | A1* | 9/2018 | Durga | G06F 11/3668 |
| 2018/0276103 | A1* | 9/2018 | Woulfe | G06F 11/362 |
| 2018/0276584 | A1* | 9/2018 | Woulfe | G06F 11/362 |
| 2022/0114076 | A1* | 4/2022 | Zhou | G06F 11/3688 |

OTHER PUBLICATIONS

A. Bachmann et al., "The Missing Links: Bugs and Bug-Fix Commits", dated Nov. 7-11, 2010, FSE'10 Proceedings of the eighteenth ACM SIGSOFT International Symposium on Foundations of Software Engineering, Total 10 pages.

M. Steff et al., "Co-Evolution of Logical Couplings and Commits for Defect Estimation," dated 2012, MSR '12 Proceedings of the 9th IEEE Working Conference on Mining Software Repositories, Faculty of Computer Science Free University of Bozen-Bolzano, Total 4 pages.

X. Meng et al., "Mining Software Repositories for Accurate Authorship", dated 2013, 2013 IEEE International Conference on Software Maintenance, Total 10 pages.

"2.1 Git Basics—Getting a Git Repository", (online), retrieved from the Internet on Mar. 12, 2018, at URL> https://git-scm.com/book/en/v2/Git-Basics-Getting-a-Git-Repository, Total 4 pages.

"2.2 Git Basics Recording Changes to the Repository", (online), retrieved from the Internet on Mar. 12, 2018 at URL> https://git-scm.com/book/en/v2, Total 9 pages.

"2.3 Git Basics—Viewing the Commit History", (online), retrieved from the Internet on Mar. 12, 2018, at URL>https://git-scm.com/book/en/v2/Git-Basics-Viewing-the-Commit-History, Total 7 pages.

* cited by examiner

FIG. 1

Issue Tracking Ticket

FIG. 2

Commit History Entry

FIG. 3

Line Entry

FIG. 4

Commit Label

FIG. 5

Code File Label

CLASSIFYING CODE AS INTRODUCING A BUG OR NOT INTRODUCING A BUG TO TRAIN A BUG DETECTION ALGORITHM

BACKGROUND OF THE INVENTION

1. Field of the Invention

The present invention relates to a computer program product, system, and method for classifying code as introducing a bug or not introducing a bug to train a bug detection algorithm.

2. Description of the Related Art

In software development version control systems, a commit adds latest changes to the source code, where the commit may provide bug fixes, feature enhancements, performance improvement, etc. The commit is then applied to the source code to make the changes to the source code, and information on the commit may be maintained in a commit history. A machine learning program may be trained to detect bugs in code by training the machine learning program with code to classify code as having a bug or not having a bug. However, in order to properly train the machine learning program to properly predict defects in code, the developer needs to label the code provided in the training, such as a commit, as either introducing a bug or not introducing a bug, which requires the developer to review the code to determine its likely effects in the source code.

There is a need in the art for developing improved techniques for classifying code to use to train a machine learning program as introducing a bug or not introducing a bug.

SUMMARY

Provided are a computer program product, system, and method for classifying code as introducing a bug or not introducing a bug to train a bug detection algorithm. For each commit in a commit history of code changes to the code base, a determination is made of lines of code changed by the commit. For each line of code of the lines of code changed by the commit, a determination is made as to whether the commit is for a bug fix. A determination is made as to whether a previous commit changing the line of code changed by the commit for the bug fix in response to determining that the commit is for the bug fix. Indication is made that the previous commit introduced a bug. The algorithm is trained to classify changes to lines of code by commits indicated as having introduced a bug as bug introducing commits.

DETAILED DESCRIPTION

To detect bugs when introducing commits in a software repository, the software developer may build a labeled dataset for machine learning usage such as a building a model for defect prediction. This dataset can also be used to show the defect introduction trending data of a development team which can be used to see if a code base is more stable and easier to work with. The effort to have developers review code and label commits as having errors can be error prone, cumbersome, costly, and time consuming. This time effort limits the amount of commits that can be used to train the bug detection machine learning program, which limits the accuracy of the machine learning program in predicting defects in commits because machine learning requires large amounts of test data to overcome statistical challenges.

Described embodiments provide improvements to computer technology, including improved data structures and computer processes, to determine whether commits to source code have introduced bugs. In described embodiments, for each commit made to a code base, a determination is made of the lines of code changed by the commit. If the commit comprises a bug fix, a determination is made of a previous commit changing the line of code changed by the commit comprising the bug fix and indication is made in a label that the previous commit introduced a bug. In certain embodiments, the determination of whether a commit comprises a bug fix may be determined by joining or considering the commit history and an issue tracking system to process issues related to commits to determine if the issues related to a commit concern a bug fix. In such case, the commit involving a bug fix may be used to determine if a line affected by the commit was previously changed by a previous commit, which would indicate the previous commit introduced a bug, and the lines of code changed by that previous commit also introduced a bug.

Figure 1:
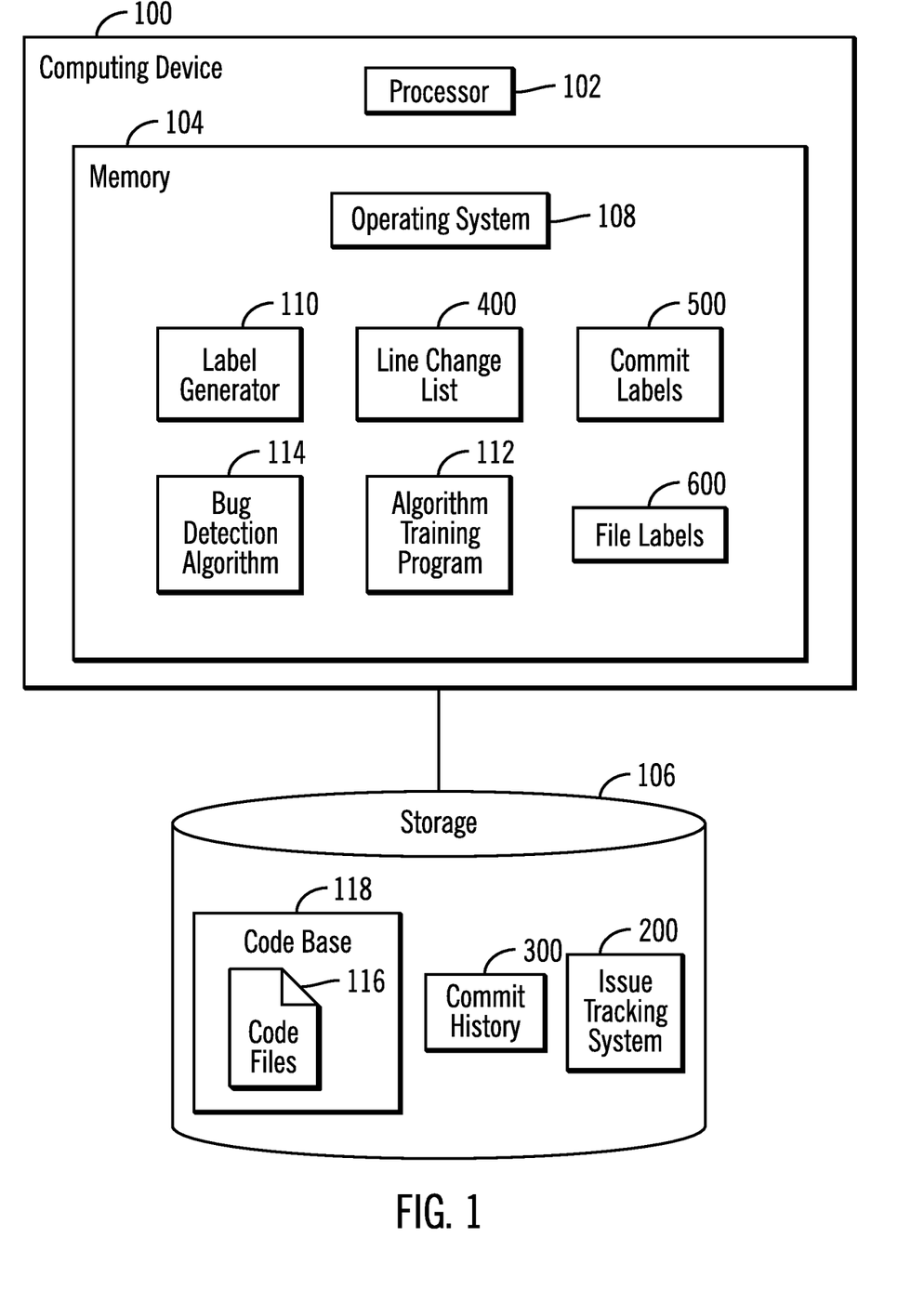
FIG. 1 illustrates an embodiment of a computing device.

FIG. 1 illustrates an embodiment of a computing device 100 in which embodiments are implemented. The computing device 100 includes a processor 102, a main memory 104, and a storage 106. The main memory 104 includes various program components including an operating system 108 and a label generator 110 and an algorithm training program 112 to assist in training a bug detection algorithm 114, which may comprise a machine learning program to classify input code in code files 116 of a code base 118 in the storage 106 as introducing a bug or not introducing a bug. The bug detection algorithm 114 may implement a machine learning technique such as decision tree learning, association rule learning, neural network, inductive programming logic, support vector machines, Bayesian network, etc. The label generator 110 processes the code files 116, an issue tracking system 200, and a commit history 300 to generate a line change list 400 of lines of code changed by commits identified in the commit history 300, and to classify the lines of code indicated in the line change list 400 as introducing a bug or not introducing a bug. The label generator 110 further generates commit labels 500 classifying whether the commits identified in the commit history 300 introduce a bug or do not introduce a bug and file labels 600 classifying whether code files 116 introduce a bug or do not introduce a bug. A bug, as that term is used herein, comprises an error, flaw, failure or fault in a computer program that causes the computer program and system in which the computer program is executing to produce an incorrect or unexpected result, or to behave in unintended ways.

The algorithm training program 112 inputs lines of code with indication that the lines of code introduce a bug or did not introduce a bug, commits with indication that the commits introduce a bug or do not introduce a bug, and code files 116 with indication that the code files 116 introduce a bug or not introduce a bug to train the bug detection algorithm 114 to classify lines of code, commits and code files as introducing bugs or not introducing bugs. In this way, the described embodiments provided improved computer technology and data structures, such as the line change list 400, commit labels 500, file labels 600, etc., to automate the classification of lines of code, commits and files as introducing bugs or not introducing bugs to use to train the bug detection algorithm 114.

The storage 106 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 104 may comprise a suitable volatile or non-volatile memory devices, including those described above.

Generally, program modules, such as the program components 108, 110, 112, and 114 may comprise routines, programs, objects, components, logic, data structures, and so on that perform particular tasks or implement particular abstract data types. The program components and hardware devices of the computing device 100 of FIG. 1 may be implemented in one or more computer systems, where if they are implemented in multiple computer systems, then the computer systems may communicate over a network.

The program components 108, 110, 112, and 114 may be accessed by the processor 102 from the memory 104 to execute. Alternatively, some or all of the program components 108, 110, 112, and 114 may be implemented in separate hardware devices, such as Application Specific Integrated Circuit (ASIC) hardware devices.

The functions described as performed by the program 108, 110, 112, and 114 may be implemented as program code in fewer program modules than shown or implemented as program code throughout a greater number of program modules than shown.

Figure 2:
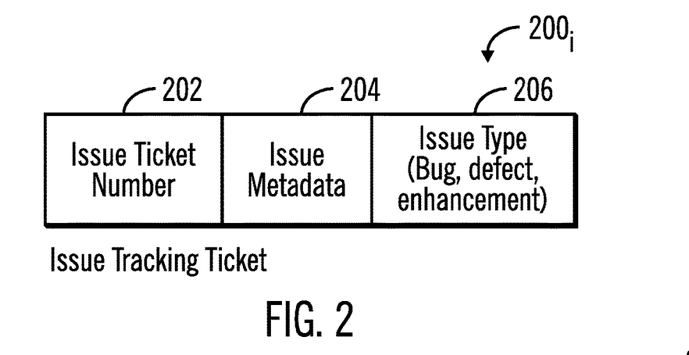
FIG. 2 illustrates an embodiment of an issue tracking ticket in an issue tracking system.

FIG. 2 illustrates an embodiment of an instance of an issue tracking ticket $200_i$ in the issue tracking system 200, including an issue ticket number 202, issue metadata 204 providing information about the issue, such as errors, problems, severity, bug, defect, enhancement, etc.; and an issue type 206 indicating the type of issue, such as bug, defect, enhancement, etc.

Figure 3:
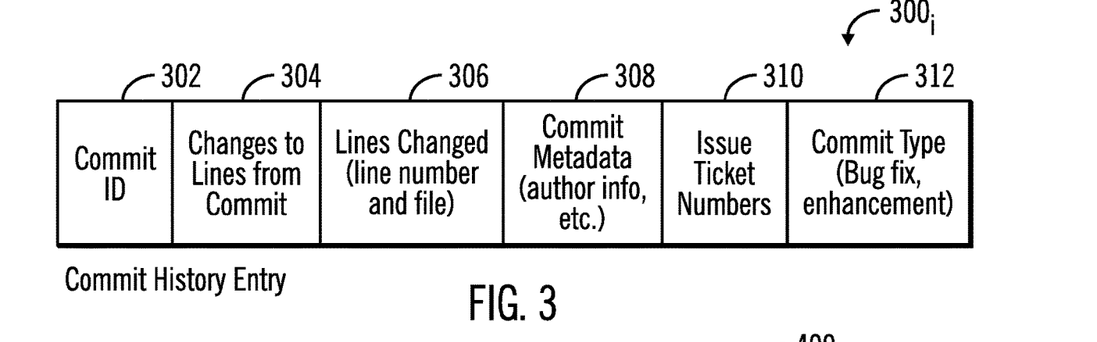
FIG. 3 illustrates an embodiment of a commit history entry in a commit history.

FIG. 3 illustrates an embodiment of a commit history entry $300_i$ in the commit history 300 providing information on a commit comprising changes to lines of code to fix an issue, such as one or more issues $200_i$ indicted in the issue tracking system 200. A commit history entry $300_i$ includes a commit identifier 302 identifying the particular commit; the changes to lines of code from the commit 304; lines of code changed 306, such as line number and code file 116 having line; commit metadata 308, such as author information, time of commit, the type of commit, etc.; one or more issue ticket numbers 310 identifying issues $200_i$ in the issue tracking system 200; and a commit type 312, such as to fix a bug, enhance code, provide additional features, improve performance, etc., which commit type 312 may be determined by processing the issue tickets 310 or natural language processing of the commit metadata 308, such as a commit message.

Figure 4:
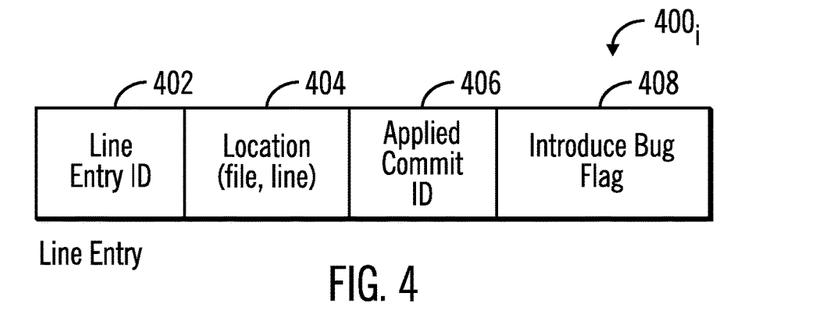
FIG. 4 illustrates an embodiment of a line entry in a line change list for a changed line of code.

FIG. 4 illustrates an embodiment of a line entry $400_i$ for a line of code in the line change list 400, including a line entry ID 402; a location 404 of the line of code, such as file 116 and line number in the file 116; applied commit ID 406 identifying a commit ID 302 to link to the commit history entry $300_i$ for the commit that modified the line of code (add, modified, delete) identified in the line entry $400_i$; and a flag 408 indicating whether the line of code introduced a bug or did not introduce a bug. There may be multiple line entries $400_i$ in the line change list 400 for each of multiple commits applied to a same line, although the location of the line, such as line number 404 in the code file 116 may change as lines in the code file 116 are added and removed.

Figure 5:
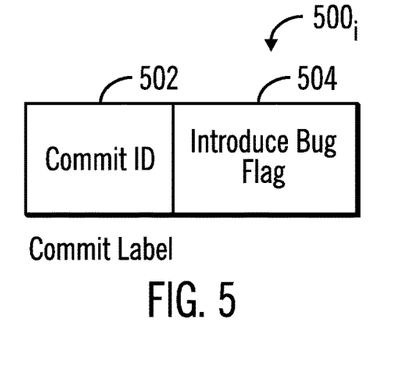
FIG. 5 illustrates an embodiment of a commit label indicating whether a commit of code to apply to the code base introduces or does not introduce a bug.

FIG. 5 illustrates an embodiment of a commit label instance 500, in the commit labels 500 that includes a commit ID 502 of a commit ID 302 for a commit history entry $300_i$ and a flag 504 indicating whether the commit introduces a bug to the code file 116 or does not introduce a bug.

Figure 6:
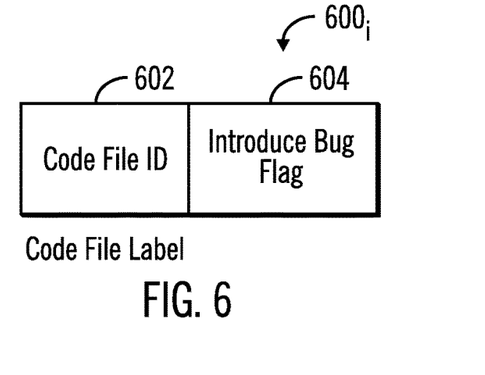
FIG. 6 illustrates an embodiment of a file label indicating whether a code file in the code base introduces or does not introduce a bug.

FIG. 6 illustrates an embodiment of a code file label instance $600_i$ in the file labels 600 that includes a code file ID 602 identifying a code file 116 and a flag 604 indicating whether the code file introduces a bug to the code base 118.

Figure 7A:
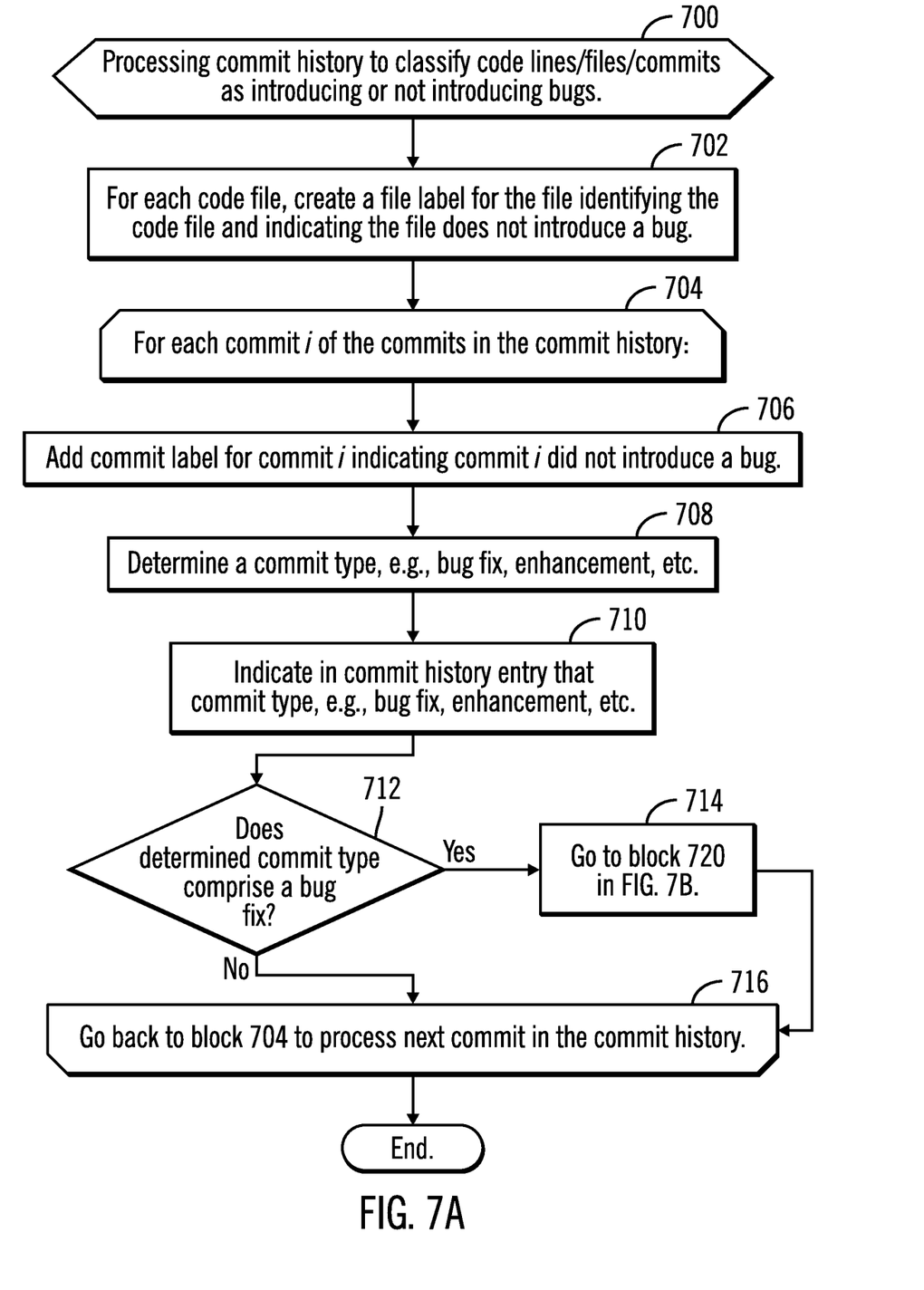
FIGS. 7a and 7b illustrate an embodiment of operations to classify code lines, files, and commits as introducing a bug or not introducing a bug.
Figure 7B:
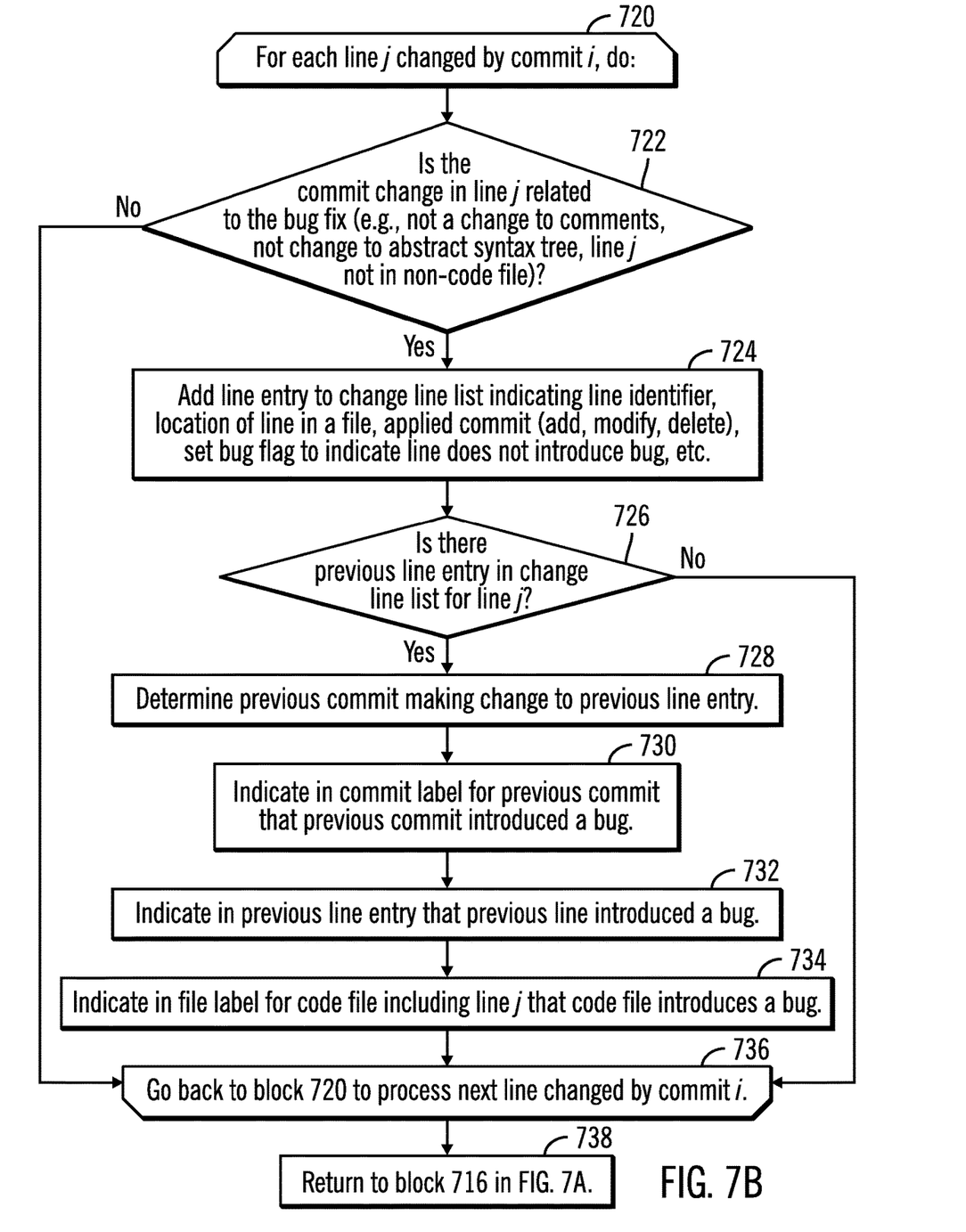
Figure 8:
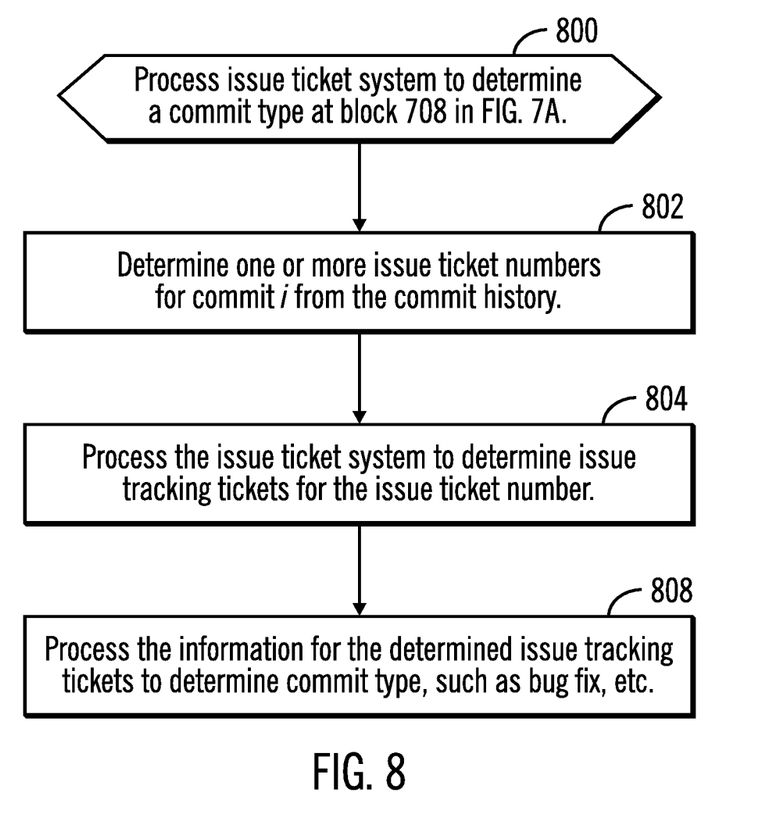
FIGS. 8 and 9 illustrate embodiments of operations to determine a commit type of a commit to modify source code.
Figure 9:
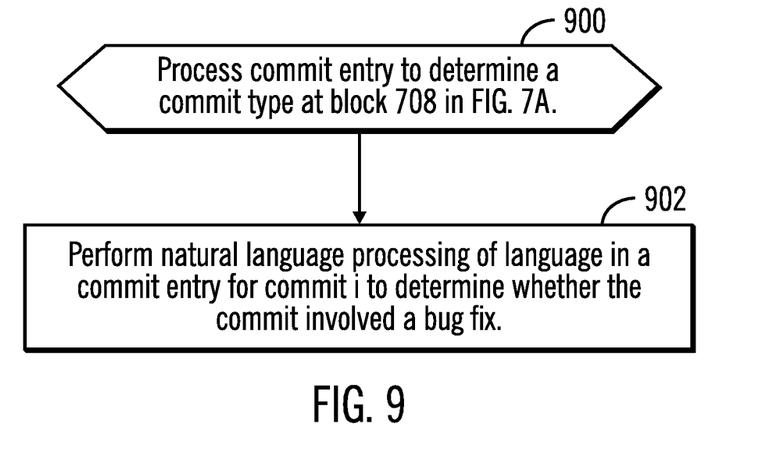

FIGS. 7a and 7b illustrate an embodiment of operations performed by the label generator 110 to classify code lines, code files 116, and commits $300_i$ as introducing bugs or not introducing bugs for use in training the bug detection algorithm 114. Upon initiating the classification processing, the label generator 110 creates (at block 702) a file label $600_i$, for each code file 116 having lines of code, identifying the code file 602 and indicating in the flag 604 that the file does not introduce a bug as a default value. A loop of operations is performed at blocks 704 through 716 for each commit $300_i$ in the commit history 300. At block 706, the label generator 110 adds (at block 706) a commit label $500_i$ for commit $300_i$ indicating in field 504 that commit $300_i$ did not introduce a bug, which is the default setting. A determination is made (at block 708) of a commit type, such as a bug fix, enhancement, etc. The label generator 110 indicates (at block 710) in the commit type 312 in the commit history entry $300_i$ the determined commit type. FIGS. 8 and 9 provide different embodiments for determining the commit type at block 708.

If (at block 712) the determined commit type comprises a bug fix, then control proceeds (at block 714) to block 720 in FIG. 7b. If (at block 712) the determined commit type does not comprise a bug fix, then control (at block 716) proceeds back to block 704 to process a next commit in the commit history 300. After processing all commits in the commit history 300, control ends.

With respect to FIG. 7b to process the lines for commit $300_i$, the label generator 110 performs a loop of operations at blocks 720 through 736 for each line j of code changed by commit $300_i$. At block 722, the label generator 110 determines whether the commit change in line j is related to the bug fix addressed by the commit $300_i$. This may be determined by determining that the change to the line is not to only at least one of comments and an abstract syntax tree, or the line j is not in a non-code file, such as an image file, markdown file, data file, etc. If (at block 722) the commit is not related to a bug fix, then control proceeds to block 736 to determine whether there is another line for commit $300_i$ to process. If (at block 722) the change is related to a bug fix, then the label generator 110 adds (at block 724) a line entry $400_j$ to the change line list 400 indicating a line identifier 402; location of line in a file 404; the applied commit 406 (add, modify, delete); and sets the introduce bug flag 408 to indicate that the line does not introduce a bug, which is a default setting for a line entry $400_j$.

If (at block 726) there is no previous line entry $400_d$ in the change line list 400 for line j subject to the change, then control proceeds to block 736 to determine whether there are further lines for commit $300_i$ to process. The previous line entry $400_d$ may comprise the previous version of the line of code j changed by a previous commit $300_c$. If (at block 726) there is a previous line entry $400_d$ in the change line list 400 for line j subject to the change, then the label generator 110 determines (at block 728) the previous commit $300_c$ making a change to the previous line entry $400_d$. This determined previous commit $300_c$ is presumed to have introduced a bug because a later bug fix commit was needed to correct a line of code changed by this previous commit. For this reason, the label generator 110 indicates (at block 730) in field 504 of the commit label $500_c$ for the previous commit $300_c$, having a commit ID 502 matching the commit ID 302 of the previous commit $300_c$, that the previous commit $300_c$ introduces a bug. The label generator 110 indicates (at block 732) in the introduce bug flag 408 of the previous line entry $400_c$ that the previous line of code introduced a bug. The label generator 110 further indicates (at block 734) in the file label $600_i$ for the code file 116 including the previous line of code that introduces a bug that the file introduces a bug, in field 604 of the file label $600_i$. After processing all the lines changed by a commit $300_i$, control returns to block 716 in FIG. 7a.

With the embodiment of FIGS. 7a, and 7b, a label generator 110 automatically classifies lines of code, a commit, and code file as introducing a bug in response to determining that a line of code in a code file that was changed by a commit was later changed by another bug fix commit that needed to change the line of code to address the bug introduced by the earlier commit.

Further, with the described embodiments, by building the change line list 400 in the memory 104 providing information on all lines of code affected by bug fix commits, the label generator 110 provides information on modified lines of code that may quickly be accessed and processed to make the determination as to whether there is a line of code changed by a current commit that was affected by a previous commit, which determination may establish a ground truth that the previous commit introduced a bug to the line of code. By building the change line list 400 in the memory 104, there is no need to have to mine a commit history repository to determine changed lines, where such mining may take considerably more time than accessing information on changed lines from the change line list in the memory. Further, by labeling a line as introducing a bug, that bug defect label may be used to determine bugs at multiple granularities, such as by line, by file, or by commit Described embodiments provide improved computer technology to keep track of lines, commits and code files having commit changes in order to be able to determine whether a subsequent commit for a bug fix needs to correct a bug introduced by a previous commit, so that the previous commit, the line of code changed by the previous commit, and the code file including the line of code changed by the previous commit can be classified as introducing a bug. These data structures and computer technologies to efficiently determine lines of code, commits and code files introducing bugs improves the efficiency of classifying lines of code, commits and code files as introducing or not introducing bugs to use to train a bug detection algorithm 114.

FIG. 8 illustrates an embodiment of operations performed by the label generator 110 to determine a commit type of a commit by processing information in the issue tracking system 200, which may be performed at block 708 in FIG. 7a. Upon initiating (at block 800) the operation to determine the commit type, the label generator 110 determines (at block 802) one or more issue ticket numbers 310 from the commit history entry $300_i$. The issue tracking system 200 is processed (at block 804) to determine the issue tracking tickets $200_i$ for the determined issue ticket numbers 310. The label generator 110 processes (at block 808) the information for the determined issue tracking tickets $200_i$, such as the issue metadata 204 and issue type information 206 to determine a commit type, such as bug fix, feature or performance enhancement, etc.

With the embodiment of FIG. 8, the label generator 110 uses information in an issue tracking system 200 having information on issues associated with commit entries $300_i$ to determine the commit type, whether the commit fixes a bug, improves performance, adds features, etc. The label generator 110 may use natural language processing or term matching to determine the commit type for an issue in the issue tracking system 200.

FIG. 9 illustrates an alternative embodiment of operations performed by the label generator 110 to determine a commit type at block 708 in FIG. 7a by processing information in the commit entry $300_i$. Upon initiating (at block 900) the operation to determine the commit type, the label generator 110 performs (at block 902) natural language processing of language in a commit entry $300_i$ for commit i, such as information in the commit metadata 308, to determine whether the commit type comprises a bug fix.

The determination of a commit type in FIGS. 8 and 9 may comprise a determination of a ground truth that a commit is a bug fix, which determination may then be used with confidence to train the bug detection algorithm 114 with accurate information. The operations of FIGS. 8 and 9 evaluate the likelihood of a commit to be a bug-fix commit based on all the words in commit log and issues to establish the bug fix commit as a ground truth. The operations of FIGS. 8 and 9 are used to determine if a commit is a bug fix when not all bugs are reported or not all bugs are labeled using common bug words or reported in a common way or commit-issue linking is not performed.

Figure 10:
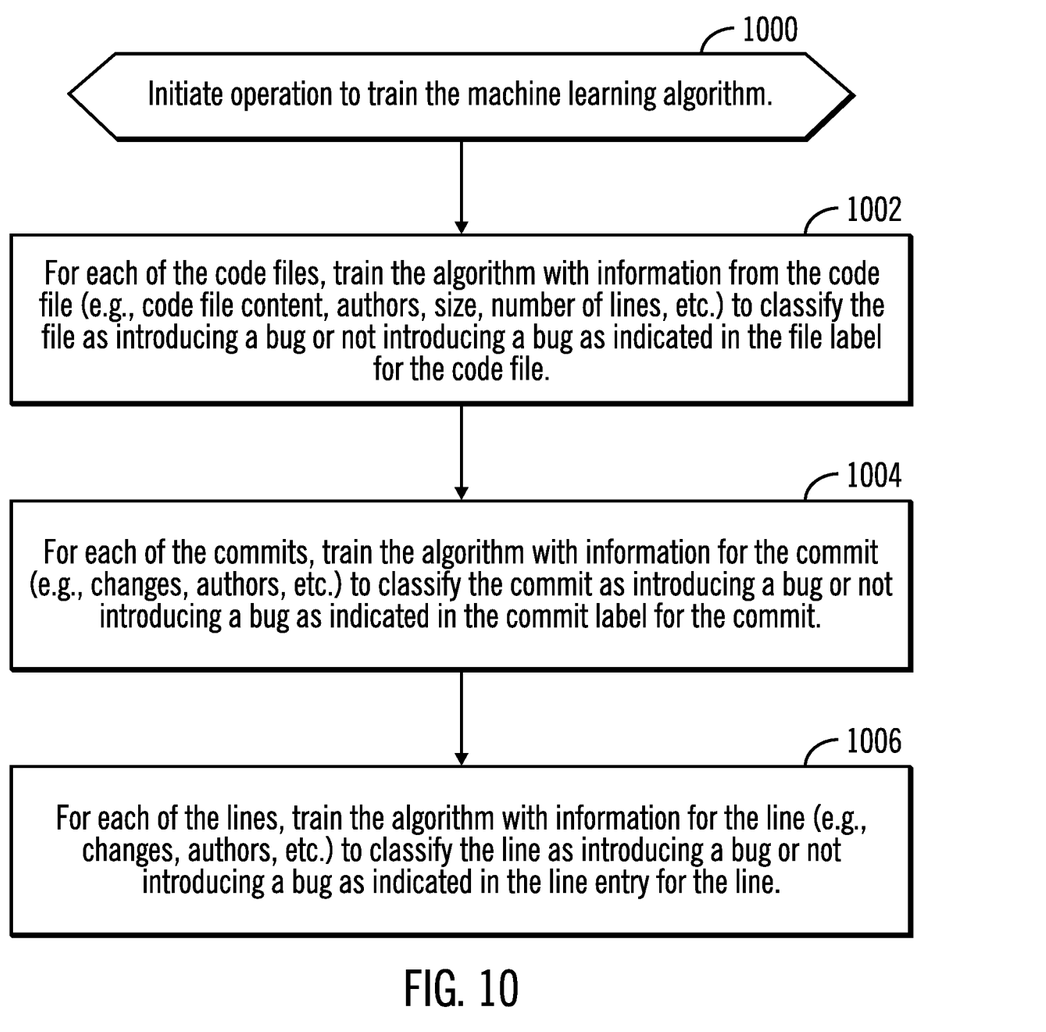
FIG. 10 illustrates an embodiment of operations to train a bug detection algorithm.

FIG. 10 illustrates an embodiment of operations performed by the algorithm training program 112 to train the bug detection algorithm 114 using the determined commit labels 500, file labels 600 and classification of whether lines of code introduce or do not introduce bugs. Upon initiating (at block 1000) an operation to train the machine learning bug detection algorithm 114, the algorithm training program 112 trains (at block 1002), for each code file $116_i$ of the code files 116 in the code base 118, the bug detection algorithm 114 with information from the code file $116_i$, such as the code file content, authors, size, number of lines, date of last modification, etc., to classify the code file $116_i$ as introducing a bug or not introducing a bug as indicated in the flag 604 in the file label $600_i$ for the code file. The algorithm training program 112 further trains (at block 1004), for each commit $300_i$ of the commits, the bug detection algorithm 114 with information for the commit $300_i$ (e.g., changes, lines changed, file having changed lines, authors, etc.) to classify the commit $300_i$ as introducing a bug or not introducing a bug as indicated in the flag 604 in the commit label $600_i$ for the commit $300_i$ on which the algorithm 114 is trained. The algorithm training program 112 further trains (at block 1006), for each of the lines $400_i$, with information for the line (e.g., changes, line content, authors, etc.) to classify the line of code as introducing a bug or not introducing a bug as indicated in the flag 408 for the line of code in the line entry 400i.

With the operations of FIG. 10, the bug detection algorithm 114 is trained to classify lines of code, commits, and code files as introducing or not introducing a bug.

The trained bug detection algorithm 114 may then later be used to classify new code lines, commits, and code files as introducing a bug or not introducing a bug to determine whether the new lines, commits or code files should be deployed. This allows the code developers to use the bug detection algorithm 114 to determine before deploying new commits whether the new commits will introduce further problems or likely not create further bugs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
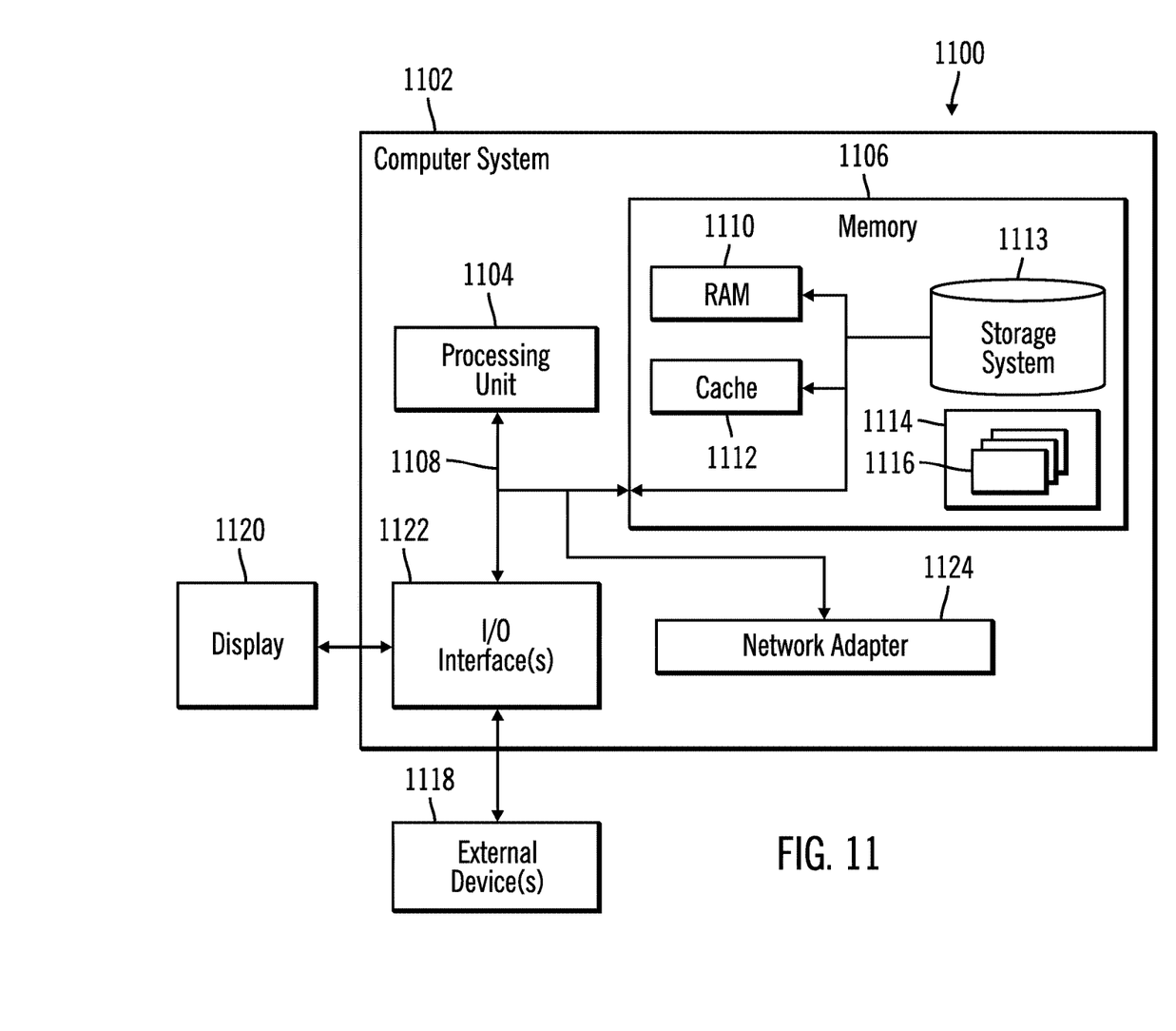
FIG. 11 illustrates a computing environment in which the components of FIG. 1 may be implemented

The computational components of FIG. 1, including the computer system 100, may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The letter designators, such as c, d, i, j, and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for training an algorithm to determine whether code changes to a code file will result in a code error, the computer program product comprising a computer readable storage medium having computer readable program code embodied therein that is executable to perform operations, the operations comprising:

providing a line change list having entries for lines of code changed by commits, wherein an entry in the line change list identifies a line of code and a commit that changes the line of code, wherein commits change lines of code in the code file;

for a line of code changed by a commit comprising a bug fix, perform:

adding an entry in the line change list indicating the line of code and the commit comprising the bug fix that changes the line of code;

processing the line change list to determine a previous entry to the added entry in the line change list indicating the line of code in the added entry and a previous commit making a previous change to the line of code indicated in the added entry;

indicating in the entry in the line change list for the previous commit and the line of code that the previous commit introduced a bug;

indicating the previous commit as introducing a bug; and indicating that the code file, including the line of code changed by the previous commit, as introducing a bug; and training the algorithm to perform at least two classifications that are a member of a set of classifications comprising:

classify code files, indicated as introducing a bug, as introducing a bug;

classify commits, indicated as introducing a bug, as introducing a bug; and classify lines of code, indicated in entries in the line change list as introducing a bug, as introducing a bug.

2. The computer program product of claim 1, wherein the operations further comprise:

in response to processing the commit, indicating that the commit did not introduce a bug; and training the algorithm to classify changes to lines of code by commits indicated as having not introduced a bug as non-bug introducing commits.

3. The computer program product of claim 1, wherein the operations further comprise:

determining an issue ticket indicted in a commit message for the commit;

processing an issue ticket system to determine information on an issue for the determined issue ticket;

determining whether the information on the issue indicates that the issue involved a bug in the code; and determining the commit comprises the bug fix in response to determining that the information on the issue from the issue ticket system indicates a bug in the code.

4. The computer program product of claim 1, wherein the operations further comprise:

performing natural language processing of language in information for the commit to determine whether the commit involved a bug fix; and determining the commit comprises a bug fix in response to determining that the language in information for the commit indicates a bug fix.

5. The computer program product of claim 1, wherein the operations further comprise:

in response to adding the entry to the change line list, indicating that the line of code did not introduce a bug; and training the algorithm to classify changes to lines of code indicated as not introducing a bug as non-bug introducing lines of code.

6. The computer program product of claim 1, wherein the operations further comprise:

indicating that each entry in the change line list, for a line of code changed by the previous commit, introduces a bug in response to determining that the commit change to the line of code is related to the bug fix.

7. The computer program product of claim 1, wherein the indicating the code file introduces the bug is performed in response to determining that at least one of the lines of code in the code file introduces a bug.

8. The computer program product of claim 1, wherein the operations further comprise:

determining, for the lines of code changed by the commit, whether the commit was for a bug fix, wherein the entry in the change line list is only added for lines of code that are changed by the commit for the bug fix.

9. The computer program product of claim 8, wherein the line of code is determined to not have code changed for a bug fix in response to:
 determining that the commit changed in the line of code only at least one of: comments and an abstract syntax tree used for compiling the code; and the line of code being included in a non-code file.

10. A system for training an algorithm to determine whether code changes to a code file will result in a code error, comprising:
 a processor; and
 a computer readable storage medium having computer readable program code that when executed by the processor performs operations, the operations comprising:
  providing a line change list having entries for lines of code changed by commits, wherein each entry in the line change list identifies a commit and a line of code changed by the identified commit, wherein commits change lines of code in the code file;
  for a changed line of code indicated in the change line list that is changed by a commit comprising a bug fix, perform:
   processing the line change list to determine a previous entry for the changed line of code indicating a previous commit making a previous change to the changed line of code;
   indicating in the entry in the line change list for the previous commit and the changed line of code that the previous commit introduced a bug;
   indicating the previous commit as introducing a bug; and
   indicating that the code file, including the line of code changed by the previous commit, as introducing a bug; and
  training the algorithm to perform at least two classifications that are a member of a set of classifications comprising:
   classify code files, indicated as introducing a bug, as introducing a bug;
   classify commits, indicated as introducing a bug, as introducing a bug; and
   classify lines of code, indicated in entries in the line change list as introducing a bug, as introducing a bug.

11. The system of claim 10, wherein the operations further comprise:
 in response to adding the entry to the change line list, indicating that the line of code did not introduce a bug; and
 training the algorithm to classify changes to lines of code indicated as not introducing a bug as non-bug introducing lines of code.

12. The system of claim 10, wherein the operations further comprise:
 indicating that each entry in the change line list, for a line of code changed by the previous commit, introduces a bug in response to determining that the commit change to the line of code is related to the bug fix.

13. The system of claim 10, wherein the indicating the code file introduces the bug is performed in response to determining that at least one of the lines of code in the code file introduces a bug.

14. The system of claim 10, wherein the operations further comprise:
 in response to processing the commit, indicating that the commit did not introduce a bug; and
 training the algorithm to classify changes to lines of code by commits indicated as having not introduced a bug as non-bug introducing commits.

15. The system of claim 10, wherein the operations further comprise:
 performing natural language processing of language in information for the commit to determine whether the commit involved a bug fix; and
 determining the commit comprises a bug fix in response to determining that the language in information for the commit indicates a bug fix.

16. The system of claim 10, wherein the operations further comprise:
 determining, for the lines of code changed by the commit, whether the commit was for a bug fix, wherein the entry in the change line list is only added for lines of code that are changed by the commit for the bug fix.

17. A method for training an algorithm executed in a computer system to determine whether code changes to a code file will result in a code error, comprising:
 providing a line change list having entries for lines of code changed by commits, wherein each entry in the line change list identifies a commit and a line of code changed by the identified commit, wherein commits change lines of code in the code file;
 for a changed line of code indicated in the change line list that is changed by a commit comprising a bug fix, perform:
  processing the line change list to determine a previous entry for the changed line of code indicating a previous commit making a previous change to the changed line of code;
  indicating in the entry in the line change list for the previous commit and the changed line of code that the previous commit introduced a bug;
  indicating the previous commit as introducing a bug; and
  indicating that the code file, including the line of code changed by the previous commit, as introducing a bug; and
 training the algorithm to perform at least two classifications that are a member of a set of classifications comprising:
  classify code files, indicated as introducing a bug, as introducing a bug;
  classify commits, indicated as introducing a bug, as introducing a bug; and
  classify lines of code, indicated in entries in the line change list as introducing a bug, as introducing a bug.

18. The method of claim 17, further comprising:
 in response to adding the entry to the change line list, indicating that the line of code did not introduce a bug; and
 training the algorithm to classify changes to lines of code indicated as not introducing a bug as non-bug introducing lines of code.

19. The method of claim 17, further comprising:
 indicating that each entry in the change line list, for a line of code changed by the previous commit, introduces a bug in response to determining that the commit change to the line of code is related to the bug fix.

20. The method of claim 17, wherein the indicating the code file introduces the bug is performed in response to determining that at least one of the lines of code in the code file introduces a bug.

21. The method of claim 17, further comprising:
in response to processing the commit, indicating that the commit did not introduce a bug; and
training the algorithm to classify changes to lines of code by commits indicated as having not introduced a bug as non-bug introducing commits.

22. The method of claim 17, further comprising:
performing natural language processing of language in information for the commit to determine whether the commit involved a bug fix; and
determining the commit comprises a bug fix in response to determining that the language in information for the commit indicates a bug fix.

23. The method of claim 17, further comprising:
determining, for the lines of code changed by the commit, whether the commit was for a bug fix, wherein the entry in the change line list is only added for lines of code that are changed by the commit for the bug fix.

\* \* \* \* \*